United States Patent [19]

Hass et al.

[11] 4,314,983

[45] Feb. 9, 1982

[54] CATALYST AND PROCESS FOR OXIDIZING HYDROGEN SULFIDE

[75] Inventors: Robert H. Hass, Fullerton; John W. Ward, Yorba Linda, both of Calif.

[73] Assignee: Union Oil Company of California, Los Angeles, Calif.

[21] Appl. No.: 27,033

[22] Filed: Apr. 4, 1979

[51] Int. Cl.$^3$ .................... C01B 17/52; C01B 17/02
[52] U.S. Cl. ................................ 423/542; 423/224; 423/573 G
[58] Field of Search ............... 423/224, 230, 522, 535, 423/539, 542, 573 G

[56] References Cited

U.S. PATENT DOCUMENTS

| | | | |
|---|---|---|---|
| 1,895,724 | 1/1933 | Miller et al. | 423/224 |
| 1,900,751 | 3/1933 | Baehr | 423/224 |
| 2,083,894 | 12/1933 | Connolly | 423/224 |
| 2,836,481 | 5/1958 | Hofstede | 423/573 G |
| 4,012,486 | 3/1977 | Singleton | 423/230 |
| 4,048,293 | 9/1977 | Renault et al. | 423/574 L |
| 4,088,743 | 5/1978 | Hass | 423/539 |
| 4,092,404 | 5/1978 | Hass | 423/539 |
| 4,123,507 | 10/1978 | Hass | 423/573 |
| 4,169,136 | 9/1979 | Hass et al. | 423/539 |
| 4,171,347 | 10/1979 | Hass | 423/539 |

FOREIGN PATENT DOCUMENTS

| | | | |
|---|---|---|---|
| 522199 | 9/1953 | Belgium | 423/535 |
| 78096 | 5/1955 | Netherlands . | |
| 341725 | 1/1931 | United Kingdom | 423/535 |
| 733004 | 7/1955 | United Kingdom | 423/230 |
| 749645 | 5/1956 | United Kingdom | 423/535 |

OTHER PUBLICATIONS

Beavon, David K. et al., High Recovery, Lower Emmissions Promised for Claus Tail Gas, Oil and Gas Journal, Mar. 12, 1979, pp. 76-80.

Beavon, David K. et al., BSR/Selectox I Sulfur Recovery Process for Claus Tail Gas Treating, 5th Canadian Symposium on Catalysis Oct. 77.

*Primary Examiner*—Gary P. Straub
*Attorney, Agent, or Firm*—Gregory F. Wirzbicki; Dean Sandford

[57] ABSTRACT

Catalysts comprising bismuth and vanadium components are highly active and stable, especially in the presence of water vapor, for oxidizing hydrogen sulfide.

64 Claims, No Drawings

CATALYST AND PROCESS FOR OXIDIZING HYDROGEN SULFIDE

BACKGROUND OF THE INVENTION

This invention relates to a process for oxidizing $H_2S$, and particularly to a process for catalytically oxidizing $H_2S$ to sulfur, $SO_2$, or both in the presence of a substantial proportion of water vapor.

Current air pollution regulations are very restrictive concerning the amount of $H_2S$ that may be discharged to the atmosphere. In some instances, gas streams may not be discharged to the atmosphere if they contain more than about 10 ppmv of $H_2S$. Thus, many processes have been developed to remove $H_2S$ from gas streams prior to their discharge to the atmosphere.

One method known in the art for removing $H_2S$ involves catalytic oxidation, that is, a gas stream containing $H_2S$ is blended with air or free oxygen, and the resulting mixture is then passed through a bed of catalyst particles under appropriate conditions such that the $H_2S$ is converted to elemental sulfur vapor or $SO_2$, or both, as desired. One catalyst useful for the gas phase conversion of $H_2S$ to sulfur or $SO_2$ is disclosed in U.S. Pat. No. 4,092,404; it comprises one or more vanadium oxides or sulfides supported on a refractory oxide such as alumina or silica-alumina. Another such catalyst is disclosed in U.S. Pat. No. 4,012,486, wherein a catalyst having active components consisting of bismuth is used to catalytically incinerate $H_2S$ to $SO_2$.

When compared, the bismuth catalyst of U.S. Pat. No. 4,012,486 will generally be found to be less active than the vanadia catalyst of U.S. Pat. No. 4,092,404 for oxidizing $H_2S$. On the other hand, a bismuth catalyst is much more stable than a vanadia catalyst when $H_2S$ must be removed from a gas stream, such as an off-gas derived from a geothermal power plant, which contains water vapor at a water vapor partial pressure of 4.0 psia or more. In general, at water partial pressures below about 1.0 psia, vanadia catalysts have satisfactory stability while at water vapor pressures above about 1.0 psia, and particularly at 1.5 psia or above, vanadia catalysts deactivate rapidly. It is believed that the reason for this deactivation is due to a complex series of chemical reactions involving the conversion of the vanadium oxide or sulfide active catalytic components to less active forms of vanadium, such as vanadyl sulfate ($VOSO_4$).

Accordingly, it is an object of the invention to provide a stable catalyst having high activity for the oxidation of $H_2S$ in the presence of water vapor. It is another object of the invention to provide a process for catalytically oxidizing $H_2S$ to $SO_2$, elemental sulfur, or some percentage combination of both, as desired. It is another object of the invention to provide a process for oxidizing $H_2S$ in the presence of water vapor at a partial pressure of more than about 1.0 psia. It is another object of the invention to provide a process for selectively oxidizing $H_2S$ in the presence of such components as $H_2$, $CO$, $NH_3$, and $CH_4$. Other objects and advantages will be apparent from the following description of the invention.

SUMMARY OF THE INVENTION

It has now been found that catalysts comprising bismuth and vanadium components are highly active and stable for the gas phase oxidation of hydrogen sulfide, especially in the presence of water vapor. Such catalysts combine the high activity of vanadia catalysts with the stability of bismuth catalysts. In addition, it has been found that the catalyst of the invention is usually substantially more stable in the presence of water vapor than catalysts comprising bismuth or vanadium alone.

The catalyst of the invention is useful when $H_2S$ must be oxidized in the gas phase in the presence of water vapor at a partial pressure of more than about 1.0 psia. Because $H_2S$ produces an equivalent volume of water vapor for each volume converted to sulfur or $SO_2$, it will be understood that reference herein to water vapor at a specified partial pressure refers to the maximum water vapor partial pressure during contacting with the catalyst.

An advantage in the invention resides in the highly selective nature of the catalyst. Components selected from the group consisting of $H_2$, $CO$, $NH_3$, and those saturated hydrocarbons gases containing no more than 6 carbon atoms (i.e., light hydrocarbons) are not oxidized in the process of the invention. Additionally, the oxidation of $H_2S$, if performed at a temperature less than about 900° F., produces essentially no $SO_3$.

All references herein to catalysts containing vanadium and bismuth or to catalysts containing vanadium and bismuth components include within their meaning catalysts containing (1) elemental vanadium and elemental bismuth, (2) elemental vanadium and one or more bismuth compounds, (3) elemental bismuth and one or more vanadium compounds, (4) one or more vanadium compounds and one or more bismuth compounds, (5) one or more compounds of bismuth and vanadium (e.g., a bismuth vanadate), or (6) a combination of any of the foregoing.

DETAILED DESCRIPTION OF THE INVENTION

Active catalysts for use in the invention comprise vanadium and bismuth as the essential active components. The essential active components may be present as the elements V and Bi, or as a mixture of individual vanadium and bismuth compounds (for example, $Bi_2S_3$ admixed with $V_2S_5$), or as a compound of both bismuth and vanadium, such as $Bi(VO_3)_3$ or $BiVO_4$. Alternatively, the catalyst may contain any combination of elements and compounds of vanadium and bismuth as the essential active components. Preferred catalysts contain at least one vanadium oxide or sulfide (e.g., $V_2O_5$, $V_2O_3$, $V_2S_5$, and $V_2S_3$) and at least one bismuth oxide or sulfide (e.g., $BiO$, $Bi_2O_3$, $Bi_2O_5$, $BiS$, $Bi_2S_3$, and $Bi_2O_4$). The most highly preferred catalyst contains at least some bismuth vanadate (i.e., as the orthovanadate, $BiVO_4$ or $Bi_2O_3.V_2O_5$, metavanadate, $Bi(VO_3)_3$, or pyrovanadate $Bi_4(V_2O_7)_3$).

The typical catalyst contains vanadium and bismuth components in an intimate mixture, and although the catalyst may consist essentially of such a mixture, it is highly preferred that the vanadium and bismuth components be composited, as by impregnation or comulling, with a carrier material. The carrier (or support) material usually comprises any refractory oxide, including, for example, such preferred refractory oxides as alumina, silica, zirconia, titania, magnesia, silica-alumina, silica-zirconia, silica-titania, silica-magnesia, silica-zirconia-titania, and combinations thereof. Suitable refractory oxides include acidic metal phosphates and arsenates, such as aluminum phosphate, boron phosphate, aluminum arsenate, chromium phosphate, etc. Other suitable supports include the hydrophobic, crystalline silicas, such as the silicalites taught in U.S. Pat. No. 4,061,724. (As used herein, a refractory oxide is hydrophobic if it is capable of absorbing no more than about 0.5 cc/gm of water). Also suitable are the amorphous and crystalline aluminosilicate zeolites, whether naturally-occurring or synthetically made. The most useful crystalline aluminosilicate zeolites are ion-exchanged so as to remove essentially all ion-exchangeable alkali or alkaline earth components. Of particular usefulness are the crystalline aluminosilicate zeolites which are hydrophobic and essentially free of alkali and alkaline earth components. Illustrative of such zeolites are the ZSM-5 zeolite disclosed in U.S. Pat. No. 3,702,886, the ZSM-11 zeolite disclosed in U.S. Pat. No. 3,709,979, and the numerous hydrophobic zeolites disclosed in U.S. Pat. No. 4,019,880. Such zeolites are characterized by high ratios of silica-to-alumina.

The most highly preferred refractory oxide carrier is silica-alumina when the alumina is present in a proportion of at least 10 weight percent, preferably between about 20 and 30 weight percent. Catalysts prepared from such supports are usually more active for oxidizing $H_2S$ than are catalysts prepared from most other refractory oxides. In addition, such supports are highly resistant to sulfation, that is, in the presence of $SO_3$ and/or $SO_2$ plus $O_2$, such supports are resistant to the formation of aluminum sulfate and the consequent loss of surface area, crushing strength, and activity. In general, it can be expected that catalysts prepared from silica-alumina supports containing at least 10 weight percent alumina will experience little if any deactivation due to sulfation under the conditions of the process hereinafter described.

There are several methods known in the art by which the vanadium and bismuth components may be composited with a refractory oxide support. One such method involves impregnation, that is, a suitable support, such as pellets or extrudates of 75% $SiO_2$-25% $Al_2O_3$ silica-alumina, is contacted with a solution of ammonium vanadate (or other soluble vanadium compound), dried at an elevated temperature (usually about 230° F.), and then contacted with a solution of a bismuth salt, such as an acidic solution of a bismuth nitrate or chloride. The composite may also be prepared by any of a variety of comulling techniques. A typical procedure involves mulling silica-alumina with solid ammonium metavanadate, solid bismuth nitrate, and sufficient water to create a paste suitable for extrusion through a die. More preferably, either or both of the vanadium and bismuth salts may be added to the mulling mixture in solution form. In a preferred embodiment, a mixture of silica-alumina, a solution of bismuth nitrate in dilute nitric acid, and an aqueous solution of ammonium metavanadate are comulled. Alternatively, a silica-alumina or other refractory oxide is comulled, for example, with an ammonium metavanadate solution, then dried or calcined at an elevated temperature, and then comulled with an aqueous solution of a bismuth salt, such as a solution of bismuth nitrate in dilute nitric acid. Comulling may also be accomplished by mixing silica-alumina with one or more bismuth vanadates in the presence of water. Alternatively still, the composite may be prepared by a combination of impregnation and comulling techniques, as by impregnating silica-alumina with ammonium vanadate, calcining, and then comulling with an acidic solution of bismuth nitrate or chloride.

After a composite is prepared by one of the foregoing impregnation and/or comulling methods or their equivalents, the composite is calcined, usually at a temperature between about 700° and about 1600° F., preferably 900°-1200° F. Calcination produces a catalyst containing vanadium and bismuth largely in the form of the oxides thereof, but usually the 700°-1600° F. calcination also produces sufficient bismuth vanadate, usually in the form of monoclinic bismuth orthovanadate ($BiVO_4$), to be detected by X-ray diffraction analysis. Bismuth orthovanadate and other bismuth vanadates are usually produced even when impregnation or comulling is accomplished without the deliberate addition of a bismuth vanadate. For example, when silica-alumina is comulled (as in Example I hereinafter) with ammonium metavanadate, then further comulled with an acidic solution of bismuth nitrate, extruded, cut into particulate form, and then calcined at 900°-1000° F., the final product contains sufficient bismuth orthovanadate to be detected by X-ray diffraction analysis.

Although the invention is not to be so limited, it is believed that catalysts containing bismuth vanadate are more active and more stable than catalysts containing no bismuth vanadate. Such is especially believed to be the case with respect to bismuth orthovanadate ($BiVO_4$). It is also believed that the reason the catalyst usually demonstrates higher stability in the presence of water vapor than is the case for catalysts containing only vanadium components or only bismuth components is due to the presence of bismuth vanadate. Hence, catalysts containing a bismuth vanadate, and particularly bismuth orthovanadate, are preferred in the invention.

Finished catalysts herein should contain at least 5.0 weight percent of vanadium and 5.0 weight percent of bismuth, calculated as $V_2O_5$ and $Bi_2O_3$, respectively. It has been found that catalysts containing less than 5.0 weight percent of either metal, while more active or stable than catalysts containing either vanadium components or bismuth components alone are somewhat less active and less stable than catalysts containing at least 5.0 weight percent of each component. Preferably, the catalyst contains between 5 and 15 weight percent of each component, but it may, if desired, contain up to 40 weight percent of each component. The most highly preferred catalyst contains between about 7 and 15 weight percent vanadium as $V_2O_5$ and between about 8 and 20 weight percent bismuth as $Bi_2O_3$. (All calculations herein with respect to the proportions of active metal components on the catalyst are reported as the weight percent of vanadium and bismuth as $V_2O_5$ and $Bi_2O_3$, respectively. Thus, a catalyst particle weighing 5 grams and containing elemental vanadium, elemental bismuth, bismuth sulfide ($Bi_2S_3$), vanadium sulfide ($V_2S_5$), and bismuth orthovanadate ($BiVO_4$), each in a weight of 0.1 grams, contains vanadium components in a proportion of 5.52 weight percent as $V_2O_5$ and bismuth components in a proportion of 5.48 weight percent as $Bi_2O_3$).

The following two Examples demonstrate preferred procedures for preparing catalysts useful in the invention.

EXAMPLE I

Four hundred twenty-one grams of 75% $SiO_2$-25% $Al_2O_3$ silica-alumina, commercially sold by the Davison Chemical Division of W. R. Grace & Co. as high alumina cracking catalyst, were placed in a steel muller, to which was added 44.2 grams of ammonium metavanadate ($NH_4VO_3$) and 6 grams of powdered methylated cellulose. The mixture was mulled for 45 minutes. A solution was then prepared by dissolving 88.8 grams of bismuth nitrate ($Bi(NO_3)_3.5H_2O$) in a liquid consisting of 200 cc. water and 32 cc. concentrated nitric acid. The solution was added to the previously mulled mixture, and mulling was contained for 15 minutes. An extrudable paste was then formed by mulling with 71 cc. of water for 15 minutes. The resulting paste was then extruded through a ⅛ inch diameter die and cut into particles having lengths between about ⅛ and ½ inch. The extrudates were then allowed to dry overnight at 230° F. The extrudates were then calcined in the presence of air at 932° F. for 2 hours. The resulting catalyst contained 9.1 weight percent vanadium components (as $V_2O_5$) and 11.2 weight percent bismuth components as $Bi_2O_3$. The catalyst contained an X-ray detectable proportion of bismuth orthovanadate.

EXAMPLE II

Sufficient ammonium metavanadate ($NH_4VO_3$) was mulled with the high alumina silica-alumina described in the preceding Example so that, after extrusion and cutting into ⅛ inch diameter by 1/16-½ inch cylindrical extrudates and calcination at a temperature of about 932° F. for 2 hours in air, the resulting product contained 10 weight percent vanadium components as $V_2O_5$. One hundred grams of such product were then contacted with a solution prepared by dissolving 35 grams of bismuth nitrate ($Bi(NO_3)_3.5H_2O$) in a mixture of 100 cc. water and 15 cc. concentrated nitric acid to which was added sufficient water to provide a solution of 120 cc. volume. The solution was allowed to contact the extrudate material for two hours to insure full impregnation. The extrudate material was then filtered, dried overnight at 230° F., and calcined at 932° F. for two hours in the presence of air. The resulting catalyst contained an X-ray detectable proportion of bismuth orthovanadate and further contained 8.63 weight percent vanadium components as $V_2O_5$ and 11.6 weight percent bismuth components as $Bi_2O_3$.

Catalysts prepared by the foregoing methods or their obvious equivalents have been found to be highly active for the gas phase oxidation of $H_2S$ to either $SO_2$, sulfur, or some percentage combination of both, as desired. In addition, such catalysts are highly selective throughout the temperature range of 250°–900° F., oxidizing $H_2S$ without forming essentially any $SO_3$ and without oxidizing any $H_2$, CO, $NH_3$, or light hydrocarbons which may also be present with the $H_2S$. Of particular importance is the fact that the catalyst is remarkably stable in the presence of water vapor. The life of the catalyst for oxidizing $H_2S$ in the presence of water vapor at a partial pressure of more than about 1.0 psia is at least 90 days, usually at least one year. The catalyst is especially useful for oxidizing $H_2S$ in the presence of water vapor at a partial pressure of at least 1.5 psia, preferably at least 4.0 psia.

The choice as to whether or not the $H_2S$ in a given gas stream is to be converted to elemental sulfur or $SO_2$ will most likely depend upon local air pollution regulations. Typically, the maximum concentration of $H_2S$ allowable for discharge is about 10 ppmv while $SO_2$ may be discharged in a maximum concentration varying between about 500 ppmv and 2.0 vol.%. Hence, incineration, i.e., conversion of $H_2S$ to $SO_2$, will usually be directed to gas streams containing between about 10 ppmv and 2.0 vol.% $H_2S$, while the typical gas stream treated for conversion to elemental sulfur will contain at least about 500 ppmv $H_2S$, preferably 500 ppmv-2.0 vol.% $H_2S$, and usually 500 ppmv-10.0 vol.% $H_2S$.

Normally, the gas streams treated in the process of the invention contain, in addition to $H_2S$, any of such components as $N_2$, $CO_2$, CO, $H_2$, $SO_2$, $O_2$, Ar, $NH_3$, $H_2O$, and light hydrocarbons. The gas streams may also contain such sulfur-containing components as COS, $CS_2$, and light mercaptans (i.e., saturated mercaptans containing no more than six carbon atoms). If such sulfur-containing components are present, it is preferred that the gas stream be pretreated by the process disclosed in U.S. Pat. No. 3,752,877, herein incorporated by reference. According to this process, $CS_2$, COS, and light mercaptans, along with $SO_2$ if present, are simultaneously converted to $H_2S$ in the presence of $H_2$ and/or water vapor by contact with a catalyst comprising one or more active catalytic components of Co, Mo, Fe, Ni, with combinations of Co with Mo or Ni with Mo being most preferred. The pretreated gas stream will then contain $H_2S$ as essentially the only gaseous sulfur component and may be treated by a process described herein so that the $H_2S$ may be converted to $SO_2$ and/or elemental sulfur as desired.

As gas stream especially suited to the foregoing pretreatment method is a Claus tail gas. Gas streams which may be treated without such pretreatment include sour natural gases and off-gases derived from geothermal steam.

Gas streams to be treated by incineration should either contain sufficient oxygen or be blended with sufficient oxygen or air so as to provide at least the stoichiometric proportion required for:

$$2H_2S + 3O_2 \rightarrow 2SO_2 + 2H_2O. \qquad (I)$$

More preferably, oxygen is present in a proportion in excess of stoichiometric, usually in a proportion between about 1.1 and 2.5 times the stoichiometric proportion. Other conditions usually employed in incinerating $H_2S$ in an adiabatic or isothermal reactor include (a) operating pressures between about 5 and 500 psia, with pressures of 15–75 psia being preferred, (b) inlet operating temperatures in the range of 250°–900° F., with temperatures below about 600° F. and especially below about 450° F. being preferred, and (c) space velocities between 100 and 50,000 v/v/hr, with 500–5000 v/v/hr being preferred. Operating conditions are appropriately adjusted so that at least 90% of the $H_2S$ is incinerated to $SO_2$. Preferably, the operating conditions are adjusted so that essentially all the $H_2S$ is incinerated. Conditions known to produce essentially full conversion of $H_2S$ to $SO_2$ include: 450° F., 50 psig, 2000 v/v/hr (gas volume calculated at 60° F.), 2.2 times the stoichiometric proportion of air, and 2700 ppmv $H_2S$ in the feed gas. The following Example III demonstrates the suitability of these conditions.

EXAMPLE III

A feed gas stream having a composition shown in Table I was blended at a rate of 460 scc/min (gas volume measured at 60° F.) with water vapor fed at a rate of 40 scc/min and air fed at the rate of 19.8 scc/min. The resultant gas mixture, having a water vapor content of 7.7 vol.% and an oxygen content of about 0.80 vol.% (2.23 times stoichiometric), was then passed for 15 days at a pressure of 50 psig, a constant temperature of 450°

F., and a space velocity of about 2000 v/v/hr through an isothermal catalytic reactor containing 15 cc. of catalyst particles comprising 11.6 weight percent bismuth components (as $Bi_2O_3$) and 8.6 weight percent vanadium components (as $V_2O_5$). The catalyst was prepared as described in Example II, and the water partial pressure within the reactor was about 5.0 psia. The product gas was analyzed on the 15th day by appropriate mass spectrometrical techniques, and the results are reported on an anhydrous basis in Table I. As shown, the $H_2S$ was completely converted to $SO_2$, and no $H_2$ or methane was oxidized. The $SO_3$ content of the effluent gas was determined to be from 3 to 5.0 ppm.

TABLE I

| | FEED COMPOSITION | PRODUCT COMPOSITION |
|---|---|---|
| Hydrogen | 873 ppmv | 838 ppmv |
| Methane | 1.68 vol.% | 1.60 vol.% |
| Nitrogen | 0 ppmv | 2.77 vol.% |
| Oxygen | 0 ppmv | 0.43 vol.% |
| Argon | 3 ppmv | 365 ppmv |
| Carbon Dioxide | 97.96 vol.% | 94.85 vol.% |
| Hydrogen Sulfide | 2717 ppmv | 0 ppmv |
| Methyl Mercaptan | 2 ppmv | 0 ppmv |
| Carbonyl Sulfide | 4 ppmv | 0 ppmv |
| Sulfur Dioxide | 36 ppmv | 2212 ppmv |
| Carbon Disulfide | 0 ppmv | 0 ppmv |
| Total Sulfur Compounds as $SO_2$[1] | 2759 ppmv | 2212 ppmv |

[1]Note: The reason a lower concentration of total sulfur compounds was found in the product gas than in the feed was due to dilution by the blend of air oxidant and also by the fact that on the 15th day of operation the $H_2S$ concentration in the feed was somewhat lower than shown in Table I.

EXAMPLE IV

Six differently prepared catalysts were tested under the conditions of Example III to determine how active and stable they were for incinerating $H_2S$ in the presence of 5.0 psia water vapor pressure. The six catalysts were prepared as follows:

10 weight percent $V_2O_5$ on silica-alumina

A mixture of ammonium vanadate and the high alumina cracking catalyst described in Example I were mulled in the presence of sufficient water to create a paste suitable for extrusion. The paste was extruded through a ⅛ inch die, cut into pieces about 1/16–½ inch in length, dried at 230° F., and calcined in air at 932° F. for two hours. The catalyst consisted of 10 weight percent vanadium components (calculated as $V_2O_5$) and silica-alumina (75% silica-25% alumina).

36.6 weight percent $V_2O_5$ on silica-alumina

One hundred and eight grams of ammonium metavanadate, 291 grams of the high alumina silica-alumina described in Example I, and 7.74 grams of methylated cellulose were mulled in the presence of sufficient water to produce an extrudable paste. The paste was then extruded and cut into ⅛ inch diameter by 1/16–½ inch long cylindrical pieces. The extrudates were dried overnight at 230° F. and calcined at 932° F. for two hours in the presence of air. The catalyst so produced contained 36.6 weight percent vanadium components (calculated as $V_2O_5$) on silica-alumina (75% $SiO_2$-25% $Al_2O_3$).

10.2 weight percent $Bi_2O_3$ on alumina

This catalyst was prepared according to a method similar to that taught in Example I of U.S. Pat. No. 4,012,486. The procedure utilized was as follows: 17 gm $BiCl_3$ was dissolved in 40 cc. water to which was added 40 cc. concentrated hydrochloric acid. The solution was then diluted with 100 cc. water. The solution so produced was allowed to contact 100 grams of gamma alumina 1/16 inch diameter extrudates for two hours. The excess liquid was then decanted off, and the impregnated extrudates were washed with a solution consisting of 30% concentrated $NH_4OH$ and 70% water until the extrudates were chloride free. The extrudates were then washed with 500 cc. water and calcined for 2 hours at 932° F. The catalyst contained 10.2% bismuth components (calculated as $Bi_2O_3$) supported on gamma alumina.

4.5 weight percent $Bi_2O_3$-9.4 weight percent $V_2O_5$ on silica alumina

This catalyst was prepared by first preparing the 10 weight percent $V_2O_5$ on silica-alumina catalyst as described above. One hundred grams of this catalyst was contacted with a solution prepared by first dissolving 11.6 gm bismuth nitrate in 100 cc. water to which was added 5 cc. concentrated nitric acid, and then further adding sufficient water to make the solution up to 120 cc. The contacting time was 2 hours, after which the excess liquid was decanted off. The impregnated extrudates were then dried at 230° F. overnight and calcined for 2 hours at 932° F. in the presence of air. The finished catalyst contained 4.5 weight percent bismuth components (calculated as $Bi_2O_3$) and 9.4 weight percent vanadium components (calculated as $V_2O_5$). By X-ray diffraction analysis, it was determined that the finished catalyst contained bismuth orthovanadate.

7.95 weight percent $Bi_2O_3$-9.0 weight percent $V_2O_5$ on silica-alumina

This catalyst was prepared according to the method shown above for the 4.5 weight percent $Bi_2O_3$-9.4 weight percent $V_2O_5$ catalyst except that the impregnating solution was prepared as follows: 23.2 gm bismuth nitrate were dissolved in 100 cc. of water plus 10 cc. nitric acid. The solution was then sufficiently diluted with water to provide a total volume of 120 cc. The finished catalyst contained 7.95 weight percent of bismuth components (as $Bi_2O_3$) and 9.0 weight percent vanadium components (as $V_2O_5$). The catalyst was found by X-ray diffraction analysis to contain bismuth orthovanadate.

11.6 weight percent $Bi_2O_3$-8.63 weight percent $V_2O_5$ on silica-alumina

This catalyst was prepared according to the method shown in Example II.

Each of the foregoing catalysts was utilized to incinerate $H_2S$ to $SO_2$ under the conditions recited in Example III. The only condition which was varied for the individual catalysts was operating temperature. After operating with the various catalysts for several days duration at temperatures varying between about 450° and 510° F., the stability each catalyst was determined by comparing the concentration of unreacted $H_2S$ in a sample of the product gas at a specified operating temperature early in the run versus the concentration of unreacted $H_2S$ in a sample of the product gas produced at the same specified temperature later in the run. The data so obtained are tabulated in Table II, and the stabilities of the various catalysts, in terms of the increase of unreacted $H_2S$ in the product gas per day, are also tabulated in Table II. As shown, the catalysts which proved most stable were those consisting of bismuth components or bismuth and vanadium components as the essential active catalytic components. Catalysts containing only vanadium components as the essential active catalytic components deactivated at unacceptably high rates. The most stable catalysts were those containing bismuth and vanadium components in proportions of at least about 8.0 weight percent and 7.0 weight percent, respectively. Such catalysts proved remarkably more stable than the 10% or 36.6% $V_2O_5$ catalyst and roughly twice as stable as the 10.2% $Bi_2O_3$ catalyst.

TABLE II

| Catalyst | ppmv $H_2S$ in Product at Time, $t_1$ | ppmv $H_2S$ in Product at Time, $t_2$ | Operating Temperature, °F. | $t_2-t_1$, Days | Deactivation Rate[1], ppmv $H_2S$/day |
|---|---|---|---|---|---|
| 10% $V_2O_5$ | 1.5 | 46.8 | 500 | 7.5 | 6.04 |
| 36.6% $V_2O_5$ | 1.5 | 51.5 | ~450 | 16.9 | 2.96 |
| 10.2% $Bi_2O_3$ | 3.3 | 12.2 | 510 | 14.1 | 0.63 |
| 4.5% $Bi_2O_3$—9.4% $V_2O_5$ | 2.9 | 6.0 | 450 | 9.9 | 0.31 |
| 7.95% $Bi_2O_3$—9.0% $V_2O_5$ | 1.4 | 3.5 | 450 | 6.0 | 0.35 |
| 11.6% $Bi_2O_3$—8.63% $V_2O_5$ | 0.5 | 3.0 | 450 | 11.0 | 0.23 |

[1]Deactivation Rate = (ppmv $H_2S$ in product at $t_2$ - ppmv $H_2S$ in product at $t_1$) ÷ ($t_2-t_1$) days.

EXAMPLE V

To compare the initial activities of the catalysts of the invention with those of the prior art, data comparing the product $H_2S$ obtained at various temperatures in the runs of Example IV prior to any significant catalyst deactivation were tabulated in Table III. Also tabulated in Table III were data obtained from an experiment run under the same conditions of Example III but using a catalyst consisting of 13.0 weight percent $Bi_2O_3$ and silica-alumina (75% $SiO_2$-25% $Al_2O_3$), which catalyst was prepared by impregnating silica-alumina extrudates with a bismuth nitrate solution followed by calcination at 932° F. for two hours in the presence of air.

As shown in Table III, the vanadia and vanadium-bismuth catalysts had comparable activities under the conditions of the experiment, leaving almost no unreacted $H_2S$ at temperatures in the 420°–450° F. range. On the other hand, the 10.2% and 13.0% bismuth catalysts were only useful at temperatures above about 500° F. At temperatures in the 490°–500° F. range, the two bismuth catalysts both showed evidence of loss of activity, with unreacted $H_2S$ being as high as 50 ppmv. Thus, the vanadia and vanadium-bismuth containing catalysts exhibited substantially better activity for the conversion of $H_2S$ to $SO_2$ than the catalysts containing only bismuth components as the essential active catalytic components.

TABLE III

| Catalyst | Temperature, °F. | ppmv $H_2S$ |
|---|---|---|
| 10% $V_2O_5$ | 445 | 4.4 |
|  | 490 | 3.4 |
|  | 500 | 1.5 |
| 36.6% $V_2O_5$ | 400 | 25 |
|  | 410 | 17 |
|  | 420 | 4.8 |
|  | 440 | 1.5 |
| 10.2% $Bi_2O_3$ | 500 | 50 |
|  | 510 | 11.8–13.4 |
|  | 520 | 3.3–8.6 |
|  | 530 | 3.6 |
| 13.0% $Bi_2O_3$ | 490 | 17.1 |
|  | 500 | ~1.0 |
|  | 510 | 0.9 |
| 4.5% $Bi_2O_3$—9.4% $V_2O_5$ | 440–450° F. | 1.7–6.0 |
| 7.95% $Bi_2O_3$—9.0% $V_2O_5$ | 450–460° F. | 1.1–3.5 |

TABLE III-continued

| Catalyst | Temperature, °F. | ppmv $H_2S$ |
|---|---|---|
| 11.6% $Bi_2O_3$—8.63% $V_2O_5$ | 450–470° F. | 0.3–4.5 |

The catalysts of the invention may also be utilized to oxidize $H_2S$ to elemental sulfur as well as for incineration to $SO_2$. To produce elemental sulfur, conditions are usually chosen for adiabatic or isothermal reactors from the following ranges: 250°–900° F. (inlet), 100–2000 v/v/hr, and 15–75 psia, and preferably from the following ranges: 300°–475° F. (inlet), 800–1000 v/v/hr, 15–20 psia. In addition, the air or oxygen blended with the gas stream is introduced so as to produce sulfur vapor according to the following reaction:

$$2H_2S + O_2 \rightarrow 2S + 2H_2O \quad (II)$$

Most preferably, the amount of air or oxygen so blended with the feed gas is such that only the stoichiometric proportion of oxygen is available. As is well-known, the highest possible conversions of $H_2S$ to sulfur are accomplished when oxygen is available in its stoichiometric proportion. Also contributing to high yields of sulfur in the gas phase are temperatures below about 475° F. and low water vapor partial pressures.

It is, of course, well-known that $SO_2$ may be used in place of oxygen for the conversion of $H_2S$ to sulfur, the sulfur being formed by the following reaction:

$$2H_2S + SO_2 \rightarrow 3S + 2H_2O \quad (III)$$

Thus, if $SO_2$ is present in the feed gas stream in any $H_2S$ to $SO_2$ ratio greater than 2.0, oxygen need only be added in an amount sufficient to react with the $H_2S$ not converted by Reaction (III). In other words, if the ratio of $H_2S$ to $SO_2$ is greater than 2.0, then the stoichiometric proportion of oxygen is that proportion sufficient to provide a molar or volumetric ratio of $H_2S$ to ($SO_2$+$O_2$) equal to 2.0.

For feed gases inherently containing $H_2S$ and $SO_2$ in an $H_2S$ to $SO_2$ ratio less than 2.0, the highest possible conversions to sulfur are obtained by firstly pretreating the feed so as to convert the $SO_2$ to $H_2S$, as by the method shown hereinbefore in U.S. Pat. No. 3,752,877, and then blending the pretreated gas with sufficient oxygen or air to provide an $H_2S$ to $O_2$ ratio equal to 2.0. For feed gases containing $H_2S$ to $SO_2$ in a ratio equal to 2.0, no pretreatment or addition of oxygen is necessary; the catalyst may be used for the direct conversion of $H_2S$ to sulfur via Reaction (III).

In view of the foregoing, it should be apparent that, when elemental sulfur is desired, $SO_2$ may be utilized as an alternative oxidant to oxygen. That is, for any gas stream containing $H_2S$, elemental sulfur may be produced herein by blending either $SO_2$ or oxygen oxidant with the gas stream such that a ratio of $H_2S$ to oxidant of 2.0 is provided. However, oxygen is inherently superior to $SO_2$, not only because of its ready availability in the form of air but also due to the higher conversions to sulfur obtainable therewith. A comparison of Reactions (II) and (III) reveals that, for the same amount of $H_2S$ converted to sulfur, 50% more sulfur is formed by Reaction (III) with $SO_2$ oxidant than by Reaction (II) with $O_2$ oxidant. The formation of 50% more sulfur by Reaction (III) necessitates higher operating temperature for Reaction (III) than for Reaction (II) if the sulfur vapor dew point is not to be exceeded. But at operating temperatures below 1000° F., the conversion of $H_2S$ to sulfur increases with decreasing temperature. Thus, because $H_2S$ can be converted to sulfur by Reaction (II) at a lower temperature than Reaction (III) without exceeding the dew point, an inherent advantage—i.e., a higher conversion—is obtained when oxygen is used as oxidant than when $SO_2$ is utilized.

Although the invention has been described in conjuncion with specific examples and embodiments thereof, it is evident that many alterations, modifications, and variations will be apparent to those skilled in the art in light of the foregoing description. For example, it should be self-evident that the catalytic process of the invention may easily be modified to oxidize $H_2S$ to any desired percentage combination of sulfur and $SO_2$ by simply controlling the proportion of oxygen between the amount required for Reaction (I) and that required for Reaction (II). Another variation of the invention involves employing two reactors each containing a vanadium-bismuth catalyst described herein, the first for converting $H_2S$ to sulfur and the second for oxidizing residual $H_2S$ to $SO_2$. Accordingly, it is intended in the invention to embrace these and all such alternatives, modifications, and variations as may fall within the spirit and scope of the appended claims.

We claim:

1. A process for oxidizing $H_2S$ in the gas phase comprising (1) contacting a gas comprising $H_2S$ and oxygen in a reaction zone with a solid catalyst whose essential active catalytic components comprise at least 5 wt.% vanadium, calculated as $V_2O_5$, and at least about 5 wt.% bismuth, calculated as $Bi_2O_3$, at contacting temperatures maintained in said reaction zone between about 250° and about 600° F. and at contacting pressures maintained between about 5 and 500 psia, with water vapor being present in said reaction zone at a partial pressure of more than about 1.0 psia, said contacting in said reaction zone being such that a substantial proportion of said $H_2S$ reacts with said oxygen to produce $SO_2$, and said catalyst being more resistant to deactivation for the conversion of $H_2S$ to $SO_2$ under the conditions maintained in said reaction zone than a comparable vanadium catalyst free of bismuth, and (2) removing from said reaction zone a substantial proportion of the $SO_2$ produced in said reaction zone.

2. A process for oxidizing $H_2S$ in the gas phase comprising (1) contacting a gas comprising $H_2S$ and oxygen in a reaction zone with a solid catalyst comprising bismuth and vanadium essential active catalytic components, said vanadium components being present in a proportion in excess of about 7 percent by weight, calculated as $V_2O_5$, and said bismuth components being present in a proportion in excess of about 8 percent by weight, calculated as $Bi_2O_3$, at contacting temperatures maintained in said reaction zone between about 250° and about 600° F. and at contacting pressures maintained between about 5 and 500 psia, with water vapor being present in said reaction zone at a partial pressure of more than about 1.0 psia, said contacting in said reaction zone being such that a substantial proportion of said $H_2S$ reacts with said oxygen to produce $SO_2$, and said catalyst being more resistant to deactivation for the conversion of $H_2S$ to $SO_2$ under the conditions maintained in said reaction zone than a comparable vanadium catalyst free of bismuth, and (2) removing from said reaction zone a substantial proportion of the $SO_2$ produced therein.

3. A process as defined in claim 2 wherein said catalyst also comprises a refractory oxide support.

4. A process as defined in claim 3 wherein said water vapor is at a partial pressure of at least 1.5 psia.

5. A process as defined in claim 3 wherein said catalyst comprises bismuth vanadate.

6. A process as defined in claim 3 or 5 wherein one or more components selected from the group consisting of $H_2$, CO, $NH_3$, and light hydrocarbons is present in said reaction zone but remain essentially completely unreacted during said contacting in said reaction zone.

7. A process as defined in claim 6 wherein said water vapor is at a partial pressure of at least 1.5 psia.

8. A process as defined in claim 5 wherein said water vapor is at a partial pressure above about 4.0 psia.

9. A process for the oxidation of $H_2S$ to $SO_2$ comprising (1) contacting, in a reaction zone wherein temperature is maintained between about 250° and 600° F. and the pressure is maintained between about 5 and 500 psia, a feed gas stream containing $H_2S$, oxygen, and water vapor at a partial pressure of at least about 1.5 psia with a catalyst comprising above about 5 wt.% bismuth, calculated as $Bi_2O_3$, and above about 5 wt.% vanadium, calculated as $V_2O_5$, as essential active catalytic components on a refractory oxide support, at least some of which bismuth and vanadium catalytic components are present in the form of bismuth oxides or sulfides and vanadium oxides or sulfides, respectively, said contacting being under conditions such that a substantial proportion of said $H_2S$ is oxidized to $SO_2$ by reaction with said oxygen in said reaction zone and said catalyst being more resistant to deactivation for the conversion of $H_2S$ to $SO_2$ under the conditions maintained in said reaction zone than a comparable bismuth-free catalyst comprising vanadium active components on a refractory oxide support, and (2) removing from said reaction zone a product gas stream containing substantially all the $SO_2$ produced in step (1).

10. A process as defined in claim 1, 2, 8, or 9 wherein said oxygen is supplied in the form of air in an amount in excess of that required for the conversion of said $H_2S$ to $SO_2$.

11. A process as defined in claim 10 wherein essentially no $SO_3$ forms in said reaction zone.

12. A process as defined in claim 1 or 9 wherein essentially no $SO_3$ is formed during the contacting in said reaction zone.

13. A process as defined in claim 12 wherein said feed gas stream also contains elemental hydrogen which remains essentially completely unoxidized during the contacting in said reaction zone.

14. A process as defined in claim 12 wherein said feed gas stream also contains ammonia which remains essentially completely unoxidized during the contacting in said reaction zone.

15. A process for the oxidation of $H_2S$ to $SO_2$ in a feed gas stream containing $H_2S$, oxygen in excess of that required for the conversion of $H_2S$ to $SO_2$, and water vapor at a partial pressure of at least about 1.5 psia, said process comprising (1) introducing, over a 90 day time period, said feed gas stream into a reaction zone wherein said feed gas stream contacts, at temperatures maintained between about 250° and about 600° F. and at contacting pressures maintained between 5 and 500 psia, a catalyst consisting essentially of vanadium and bismuth components on a refractory oxide support, at least some of which vanadium and bismuth components are present in the form of vanadium oxides or sulfides and bismuth oxides or sulfides, respectively, said contacting being such that at least 90% of said $H_2S$ is converted to $SO_2$ by reaction with said oxygen in said reaction zone, said catalyst maintaining substantially undiminished activity for reacting $H_2S$ to $SO_2$ during said 90 day time period, and (2) removing from said reaction zone a product gas stream containing substantially all the $SO_2$ produced in said reaction zone.

16. A process as defined in claim 9, or 15, wherein said feed gas stream also contains elemental hydrogen which remains essentially completely unoxidized during the contacting in said reaction zone.

17. A catalytic process for selectively oxidizing $H_2S$ to $SO_2$ in the gas phase comprising (1) introducing, over at least a 90 day time period, a feed gas stream containing $H_2S$, oxygen in a proportion substantially in excess of that required to convert said $H_2S$ to $SO_2$, water vapor at a partial pressure of at least about 1.5 psia, and a substantial proportion of one or more additional components selected from the group consisting of $H_2$, CO, $NH_3$, and light hydrocarbons into a reaction zone wherein said feed gas stream contacts, at contacting temperatures maintained between about 250° and 600° F. and at contacting pressures maintained between 5 and 500 psia, a catalyst consisting essentially of vanadium and bismuth active catalytic components on a refractory oxide support, said contacting being such that at least a 90% conversion of said $H_2S$ to $SO_2$ by reaction with said oxygen is obtained in said reaction zone without oxidizing essentially any of said additional components, with said catalyst maintaining substantially undiminished activity for converting at least 90% of the $H_2S$ to $SO_2$ during said 90 day time period, and (2) removing from said reaction zone a product gas stream containing essentially all the $SO_2$ produced in step (1), with said product gas stream further containing essentially all of said additional components as were present in the feed gas stream.

18. A process as defined in claim 9, 15, or 17 wherein said catalyst comprises between 5 and 40 weight percent of vanadium components and between about 5 and 40 weight percent bismuth components, calculated as $V_2O_5$ and $Bi_2O_3$, respectively.

19. A process as defined in claim 18 wherein said refractory oxide support is silica-alumina, with the alumina content of said silica-alumina being between 20 and 30 weight percent.

20. A process as defined in claim 18 wherein said refractory oxide comprises a support selected from the group consisting of silica, silica-alumina, alumina, titania, silica-zirconia, zirconia, silica-titania, silica-zirconia-titania, silica-magnesia, and combinations thereof.

21. A process as defined in claim 20 wherein said feed gas stream contains water vapor at a partial pressure above about 4.0 psia.

22. A process as defined in claim 9, 15, or 17 wherein said catalyst contains bismuth vanadate.

23. A process as defined in claim 20 wherein said catalyst contains bismuth vanadate.

24. In a process for catalytically incinerating $H_2S$ to $SO_2$ in a reaction zone by reaction with oxygen, the improvement wherein said incinerating comprises contacting in said reaction zone said $H_2S$ aand said oxygen at temperatures maintained between about 250° and about 600° F. and at pressures maintained between about 5 and 500 psia, in the presence of water vapor at a partial pressure of at least about 1.5 psia, with a solid catalyst whose essential active components comprise at least 5 wt.% vanadium, calculated as $V_2O_5$, and at least 5 wt.% bismuth, calculated as $Bi_2O_3$, said catalyst being more resistant to deactivation for the conversion of $H_2S$ to $SO_2$ under the conditions maintained in said reaction zone than a comparable catalyst free of bismuth.

25. A process for the oxidation of $H_2S$ to $SO_2$ comprising (1) blending a feed gas stream containing $H_2S$ and sufficient water vapor with air such that the resulting blended gas stream contains excess oxygen for the conversion of $H_2S$ to $SO_2$ and further contains water vapor at a partial pressure of at least 1.5 psia, (2) passing the blended gas stream through a bed of catalyst particles in a reaction zone wherein temperature is maintained in the range of 250° to 600° F. and pressure is maintained between 5 and 500 psia, said catalyst particles consisting essentially of vanadium and bismuth components supported on a refractory oxide carrier, said vanadium and bismuth components comprising at least some vanadium oxides or sulfides and at least some bismuth oxides or sulfides, respectively, said contacting being such that at least about 90% of the $H_2S$ in said blended gas stream is converted to $SO_2$ by reaction with oxygen, and said catalyst being more resistant to deactivation for the conversion of $H_2S$ to $SO_2$ under the conditions maintained in said reaction zone than a comparable catalyst consisting essentially of vanadium active components on a refractory oxide support, and (3) removing from said catalyst bed a product gas stream containing substantially all the $SO_2$ produced in step (1).

26. A process as defined in claim 25 wherein said catalyst consists essentially of more than about 7 percent by weight vanadium components, calculated as $V_2O_5$, and more than about 8 percent by weight bismuth components, calculated as $Bi_2O_3$, on a support selected from the group consisting of alumina, silica, titania, zirconia, silica-alumina, silica-titania, silica-zirconia, silica-magnesia, and combinations thereof.

27. A process as defined in claim 25 or 26 wherein said feed gas stream contains between about 500 ppmv and 10.0 volume percent $H_2S$.

28. A process as defined in claim 27 wherein said feed gas stream contains water vapor at a partial pressure of at least about 4.0 psia.

29. A process as defined in claim 27 wherein essentially no $SO_3$ is formed in said reaction zone.

30. A process as defined in claim 27 wherein said catalyst comprises bismuth vanadate.

31. A process as defined in claim 30 wherein essentially no $SO_3$ is formed in said reaction zone.

32. A process as defined in claim 27 wherein said feed gas stream also contains elemental hydrogen, which remains essentially completely unreacted in step (2) and is recovered as a component of said product gas.

33. A process as defined in claim 32 wherein said feed gas stream contains water vapor at a partial pressure of at least about 4.0 psia.

34. A process as defined in claim 33 wherein said catalyst comprises bismuth vanadate.

35. A process as defined in claim 32 wherein said catalyst comprises bismuth vanadate.

36. A process as defined in claim 35 wherein essentially no $SO_3$ is formed in said reaction zone.

37. A process for the catalytic conversion of $H_2S$ to $SO_2$ in the gas phase comprising (1) contacting, in a reaction zone wherein temperature is maintained between about 250° and 900° F., $H_2S$ and oxygen present in an amount in substantial excess of that required to convert said $H_2S$ to $SO_2$ with a catalyst consisting essentially of vanadium and bismuth as the essential active components on a carrier selected from the group consisting of refractory oxides, hydrophobic crystalline silicas, amorphous aluminosilicate zeolites, crystalline aluminosilicate zeolites, and mixtures thereof, said contacting in said reaction zone being such that a substantial proportion of said $H_2S$ is converted to $SO_2$ without forming essentially any $SO_3$ and (2) removing from said reaction zone a substantial proportion of the $SO_2$ produced therein.

38. A process as defined in claim 37 wherein water vapor is present in said reaction zone at a partial pressure of at least 1.5 psia and temperature is maintained in said reaction zone below about 600° F. while pressure is maintained between 5 and 500 psia.

39. A process for the oxidation of $H_2S$ to $SO_2$ comprising (1) contacting, in a reaction zone wherein temperature is maintained between about 250° and 900° F. and the pressure is maintained between 5 and 500 psia, a feed gas stream containing $H_2S$, oxygen in a proportion in substantial excess of that required to convert said $H_2S$ to $SO_2$, and water vapor at a partial pressure of at least about 1.5 psia with a catalyst consisting essentially of bismuth and vanadium components on a refractory oxide carrier, at least some of which bismuth and vanadium components are present in the form of bismuth oxides or sulfides and vanadium oxides or sulfides, respectively, said contacting in said reaction zone being such that at least about 90% of said $H_2S$ is converted to $SO_2$ by reaction with oxygen without forming essentially any $SO_3$ and (2) removing from said reaction zone a product gas stream essentially free of $SO_3$ but containing essentially all the $SO_2$ produced in said reaction zone.

40. A catalytic process for selectively oxidizing $H_2S$ to $SO_2$ in the gas phase comprising (1) introducing, over at least a 90 day time period, a feed gas stream containing $H_2S$, oxygen in substantial excess of that required to convert said $H_2S$ to $SO_2$, and a substantial proportion of one or more additional components selected from the group consisting of $H_2$, CO, $NH_3$, and light hydrocarbons into a reaction zone wherein said feed gas stream contacts, at contacting temperatures maintained between about 250° and about 900° F., a catalyst consisting essentially of vanadium and bismuth components on a refractory oxide carrier, said catalyst containing a vanadium oxide or sulfide and a bismuth oxide or sulfide, and said contacting being such that at least a 90% conversion of said $H_2S$ to $SO_2$ by reaction with said oxygen is obtained in said reaction zone without oxidizing essentially any of said additional components and without producing essentially any $SO_3$, with said catalyst maintaining substantially undiminished activity for reacting at least 90% of said $H_2S$ with said oxygen to produce said $SO_2$ during said 90 day time period, and (2) removing from said reaction zone an essentially $SO_3$-free product gas stream containing substantially all the $SO_2$ produced in said reaction zone, with said product gas stream further containing essentially all of said additional components as were present in the feed gas stream.

41. A process as defined in claim 37, 39, or 40 wherein said catalyst comprises bismuth vanadate.

42. A process as defined in claim 39, or 40 wherein said catalyst consists essentially of vanadium components present in a proportion greater than about 7 weight percent, calculated as $V_2O_5$, and bismuth components present in a proportion greater than about 8 weight percent, calculated as $Bi_2O_3$, on a support selected from the group consisting of alumina, silica, titania, zirconia, silica-alumina, silica-titania, silica-zirconia, silica-magnesia, and combinations thereof.

43. A process as defined in claim 42 wherein said support is silica-alumina, with the alumina content of said silica-alumina being between about 20 and 30 weight percent.

44. A process as defined in claim 42 wherein said catalyst comprises bismuth vanadate.

45. A process as defined in claim 43 wherein said catalyst comprises bismuth vanadate.

46. In a process for catalytically incinerating $H_2S$ to $SO_2$ in a reaction zone by reaction with oxygen, the improvement wherein said incinerating comprises contacting in said reaction zone said $H_2S$ and oxygen supplied in an amount in excess of that required for the conversion of said $H_2S$ to $SO_2$ at a temperature maintained between about 250° and 900° F. with a solid catalyst comprising vanadium and bismuth active catalytic components on a carrier material, said vanadium and bismuth components each being present in a proportion above about 5 percent by weight, calculated as $V_2O_5$ and $Bi_2O_3$, respectively, under conditions such that at least 90% of said $H_2S$ is converted to $SO_2$ without the formation of a substantial amount of $SO_3$.

47. In a process for catalytically incinerating $H_2S$ to $SO_2$ in a reaction zone by reaction with oxygen, the improvement wherein said incinerating comprises contacting in said reaction zone said $H_2S$ and oxygen supplied in an amount in excess of about 1.1 times stoichiometric for the conversion of said $H_2S$ to $SO_2$ at temperatures maintained between about 250° and 900° F. with a solid catalyst comprising vanadium and bismuth active catalytic components on a carrier material, said vanadium components being present in said catalyst in a proportion in excess of about 7 percent by weight, calculated as $V_2O_5$, and said bismuth components being present in a proportion in excess of about 8 percent by weight, calculated as $Bi_2O_3$, under conditions such that at least 90% of said $H_2S$ is converted to $SO_2$ without the formation of a substantial amount of $SO_3$.

48. A process as defined in claim 47 wherein said oxygen is supplied in an amount between 1.1 and 2.5 times stoichiometric.

49. In a process for catalytically incinerating $H_2S$ to $SO_2$ in a reaction zone by reaction with oxygen, the improvement wherein said incinerating comprises contacting in said reaction zone said $H_2S$ and oxygen supplied in excess of that required for the conversion of $H_2S$ to $SO_2$ at temperatures maintained between about 250° and 900° F. with a solid catalyst consisting essentially of vanadium and bismuth catalytically active components on a carrier material under conditions such that a substantial proportion of said $H_2S$ is converted to $SO_2$ without the formation of essentially any $SO_3$.

50. A process as defined in claim 46 or 49 wherein said oxygen is supplied in the form of air and is supplied in substantial excess of that required for the conversion of said $H_2S$ to $SO_2$.

51. A process as defined in claim 46, 47, 49, or 48 wherein ammonia is present during said contacting but remains substantially completely unoxidized.

52. A process as defined in claim 46, 47, 49, or 48 wherein water vapor is present during said contacting at a partial pressure above about 4.0 psia.

53. A process as defined in claim 1, 2, 5, 8, 9, 15, 46, 47, 49, or 48 wherein said contacting in said reaction zone is such that essentially all of said $H_2S$ is converted to $SO_2$.

54. In a process for catalytically incinerating $H_2S$ to $SO_2$ in a reaction zone by reaction with oxygen, the improvement wherein said incinerating comprises contacting in said reaction zone said $H_2S$ and said oxygen at contacting temperatures maintained between about 250° and about 600° F. and at contacting pressures maintained between 5 and 500 psia, in the presence of water vapor at a partial pressure of at least about 1.5 psia, with a solid catalyst whose essential active components comprise vanadium and bismuth in a proportion above 5 wt.% each, calculated as $V_2O_5$ and $Bi_2O_3$, respectively, said catalyst having a deactivation rate no greater than about 0.35 vppm $H_2S$ per day when tested for the conversion of $H_2S$ to $SO_2$ under the following conditions: 450° F., 50 psig, and 2000 v/v/hr with a blended gas stream comprising a gas stream containing about 2717 vppm $H_2S$, about 97.96 vol.% $CO_2$, about 1.68 vol.% $CH_4$, and about 873 vppm $H_2$ blended with sufficient air and water vapor to provide an oxygen content of about 0.80 vol.% and a water vapor content of about 7.7 vol.% in said blended gas stream.

55. In a process for catalytically incinerating $H_2S$ to $SO_2$ in a reaction zone by reaction with oxygen, the improvement wherein said incinerating comprises contacting in said reaction zone said $H_2S$ and said oxygen at contacting temperatures maintained between about 250° and about 600° F. and at contacting pressures maintained between 5 and 500 psia, in the presence of water vapor at a partial pressure of at least about 1.5 psia, with a solid catalyst consisting essentially of vanadium and bismuth essential active components on a carrier material, said catalyst being characterized by a greater activity for the conversion of $H_2S$ to $SO_2$ over a 6 day time period under conditions similar to those maintained in said reaction zone than a first comparable catalyst consisting essentially of vanadium components on a carrier material and a second comparable catalyst consisting essentially of bismuth components on a carrier material.

56. A process as defined in claim 55 wherein said catalyst contains vanadium essential active components in a proportion above about 7 percent by weight, calculated as $V_2O_5$, and bismuth essential active components in a proportion above about 8 percent by weight, calculated at $Bi_2O_3$.

57. In a process for catalytically incinerating $H_2S$ to $SO_2$ in a reaction zone by reaction with oxygen, the improvement wherein said incinerating comprises contacting in said reaction zone said $H_2S$ and said oxygen at contacting temperatures maintained between about 250° and about 600° F. and at contacting pressures maintained between about 5 and 500 psia, in the presence of water vapor at a partial pressure of at least about 1.5 psia, with a solid catalyst comprising vanadium and bismuth essential active components on a refractory oxide, said vanadium essential active components being present in a proportion of at least about 7 percent by weight, calculated as $V_2O_5$, and the bismuth essential active components in a proportion of at least about 8 percent by weight, calculated as $Bi_2O_3$, and said catalyst being characterized by the maintenance of a greater activity for the conversion of $H_2S$ to $SO_2$ over a 90 day time period under conditions similar to those maintained in said reaction zone than a first comparable catalyst consisting essentially of vanadium components on a refractory oxide and a second comparable catalyst consisting essentially of bismuth components on a refractory oxide.

58. A process as defined in claim 57 wherein said contacting in said reaction zone is accomplished in the presence of elemental oxygen supplied in an amount above that required for the conversion of $H_2S$ to $SO_2$.

59. A process as defined in claim 58 wherein said water vapor is present in said reaction zone at a partial pressure of at least about 4.0 psia.

60. A process as defined in claim 24, 54, or 57 wherein said essential active components of said catalyst consist essentially of vanadium and bismuth.

61. A process as defined in claim 60 wherein said contacting in said reaction zone is accomplished in the presence of elemental oxygen supplied in an amount above that required for the conversion of said $H_2S$ to $SO_2$.

62. A process as defined in claim 61 wherein said water vapor is present in said reaction zone at a partial pressure of at least about 4.0 psia.

63. A process as defined in claim 1, 2, 9, 15, 17, 24, 25, 39, 38, 54, 55, or 57 wherein said reaction zone is maintained at a pressure of about 15 psia.

64. A process as defined in claim 1, 2, 9, 15, 17, 24, 25, 39, 38, 54, 55, or 57 wherein said reaction zone is maintained at a pressure between about 15 and 75 psia.

* * * * *